United States Patent [19]

Hata et al.

[11] Patent Number: 4,964,933
[45] Date of Patent: Oct. 23, 1990

[54] METHOD FOR PRODUCING AN INSULATING POLYOLEFIN LAMINATED PAPER

[75] Inventors: Ryosuke Hata; Shosuke Yamanouchi; Masayuki Hirose, all of Osaka; Hidemitsu Kuwabara; Yasuharu Mizumoto, both of Shizuoka; Yasuhiro Hagiuda, Shizuoka, all of Japan

[73] Assignee: Sumitomo Electric Industries, Ltd., Osaka, Japan

[21] Appl. No.: 337,998

[22] Filed: Apr. 14, 1989

Related U.S. Application Data

[62] Division of Ser. No. 196,403, May 20, 1988, Pat. No. 4,859,804, which is a division of Ser. No. 927,984, Nov. 7, 1986, Pat. No. 4,762,965, which is a division of Ser. No. 649,004, Sep. 10, 1984, Pat. No. 4,673,607.

[30] Foreign Application Priority Data

Sep. 9, 1983 [JP] Japan .................. 58-167082

[51] Int. Cl.⁵ .............. B29C 47/06; B32B 31/08
[52] U.S. Cl. .................. 156/209; 156/219; 156/243; 156/244.11; 156/244.22; 156/244.23; 156/244.25; 428/156; 428/161; 428/162; 428/171; 428/172; 428/232; 428/511; 428/537.5; 174/23 R; 174/25 R; 162/112; 162/132; 162/138
[58] Field of Search ........... 156/209, 219, 243, 244.11, 156/244.24, 244.25, 244.22; 428/156, 161, 141, 153, 154, 170, 172, 213, 537.5; 162/112, 132, 138, 124; 174/23 R, 23 R

[56] References Cited

U.S. PATENT DOCUMENTS

| | | | |
|---|---|---|---|
| 1,774,573 | 9/1930 | Spafford | 162/112 |
| 3,294,618 | 12/1966 | Busche et al. | 162/124 |
| 3,427,394 | 2/1969 | McKean | 162/138 |
| 3,532,800 | 10/1970 | Wyly et al. | 162/138 |
| 3,547,723 | 12/1970 | Gresham | 156/219 |
| 3,728,465 | 4/1973 | Yasui et al. | 162/138 |
| 3,953,638 | 4/1976 | Kemp | 156/209 |
| 4,196,044 | 4/1980 | Mussoni et al. | 162/112 |
| 4,487,796 | 12/1984 | Lloyd et al. | 162/112 |
| 4,543,142 | 9/1985 | Kuepper et al. | 156/219 |
| 4,673,607 | 6/1987 | Hata et al. | 428/172 |
| 4,762,965 | 8/1988 | Hata et al. | 174/23 R |
| 4,859,804 | 8/1989 | Hata et al. | 174/25 R |

*Primary Examiner*—Caleb Weston
*Attorney, Agent, or Firm*—Sughrue, Mion, Zinn, MacPeak & Seas

[57] ABSTRACT

An insulating polyolefin laminate paper and a method for producing such a paper in which first and second fiber paper layers are laminated to a polyolefin film layer. The fiber paper layers have an impermeability of 20 to 4000 Gurley-seconds. At least one of the fiber paper layers is mechanically deformed in such a manner that irregularities are produced having a depth of 2 to 50% of the thickness of the fiber paper layer. The mechanical deformation is accomplished prior to lamination. Before lamination, the water content of the fiber paper layers is controlled to be no more than 4%. Preferably, the thickness of the fiber paper layers is at least 30 microns. Furthermore, an electric power supply cable includes an insulating polyolefin laminate paper as an insulating layer.

5 Claims, 4 Drawing Sheets

METHOD FOR PRODUCING AN INSULATING POLYOLEFIN LAMINATED PAPER

This is a Division of application Ser. No. 07/196,403, filed 5/20/88, U.S. Pat. No. 4,859,804 which is a division of application Ser. No. 06/927,984 filed 11/7/86, U.S. Pat. No. 4,762,965 which is a division of application Ser. No. 06/649,004 filed 9/10/84, U.S. Pt. No. 4,673,607.

BACKGROUND OF THE INVENTION

The present invention relates to a polyolefin laminate paper used for electrical insulation which is formed by bonding together fiber paper layers and a molten and extruded polyolefin layer The invention relates more specifically to such a polyolefin laminate paper in which the amount of thickness increase due to swelling is reduced, but with no deterioration of the electrical and mechanical characteristics thereof caused when the polyolefin layer is swelled by insulating oil. The invention also relates to an electric power supply cable incorporating the laminate paper.

Polyolefin laminate paper has an excellent dielectric characteristic and high dielectric strength. Therefore, it is often used as an insulating material for electrical equipment such as ultra- or ultra-super high voltage cables. However, because of various difficulties, polyolefin laminate paper has not found wide application as an insulating material for more common types of electrical equipment. The most significant difficulty is that a polyolefin film layer which forms a part of the laminate paper is swelled by the insulating oil in the electrical equipment, for instance, a hydrocarbon insulating oil such as mineral oil, alkyl benzene or alkyl naphthalene oil, as a result of which the thickness of the film layer is increased.

The increase of thickness results in the following two problems

Firstly, the increase in thickness of the polyolefin film layer lowers the fluidity of the insulating oil in the insulating layer which is required for compensating for the expansion or contraction of the insulating oil caused as the temperature of the electrical equipment changes.

In conventional laminated kraft paper insulated electrical equipment, the kraft papers are porous, and therefore the insulating oil can flow in the widthwise direction of the kraft papers. On the other hand, in a polyolefin laminate paper, due to the presence of a plastic film layer, it is difficult for the insulating oil to flow in the widthwise direction of the laminate paper. Accordingly, the insulating oil is forced to flow along the surfaces of the laminate paper through the air gaps formed by irregularities on the surfaces of the kraft papers or the air gaps among the fibers of the kraft papers, or it is forced to flow through the gap between the laminate papers. Thus, even before the thickness of the film layer is increased, the fluidity of the insulating oil is essentially low. This difficulty may be overcome to some degree by employing kraft paper whose impermeability is relatively low. However, when the film layer increases in thickness upon being swelled in the insulating oil, then the kraft paper layers are compressed, as a result of which the air gaps are reduced and the fluidity of the insulating oil is lowered. That is, it is impossible for the insulating oil to flow in the electrical equipment as required.

The second problem occurs with compression of the kraft paper layers. Compression of the kraft paper layers increases the surface pressure between adjacent tapes, thus making it difficult for the tapes to slide on each other. For instance, when a cable is bent, the tapes can be creased or possibly cracked. Thus, the quality of the cable is lowered by the compressed kraft paper layers.

These phenomena become significant with an increase of thickness of the film layer or the percentage of the thickness of the polyolefin film layer with respect to the entire thickness of the polyolefin laminate paper. Accordingly, it is necessary to reduce the percentage of the thickness of the polyolefin film layer with respect to the entire thickness of the polyolefin laminate paper as the entire thickness of the polyolefin laminate paper increases.

The swelling of the polyolefin laminate paper for electrical insulation may be suppressed by various methods. A first method is a so-called "annealing method" in which, for instance, in the case of a cable, after taping, a heat treatment is carried out in a vacuum at a temperature lower than the melting point of polyolefin for a predetermined period of time to increase the degree of crystallinity of the polyolefin film, thereby to suppress the swelling in the insulating oil. A second method is a so-called "humidity adjusting method" in which cellulose fiber paper layers are caused to absorb moisture to expand in advance, and the decrease in thickness of the fiber paper layers which is caused by drying after the taping operation is utilized to suppress the increase in thickness of the polyolefin film layer which is caused by the swelling A third method is a so-called "after-embossing method" in which a laminate paper, formed by combining fiber papers and a polyolefin film, is embossed so that irregularities are mechanically formed thereon Deformation of the irregularities is utilized to absorb the increase in thickness of the film layer which is caused when it is swelled in the insulating oil.

As object of the invention is to provide a novel polyolefin laminate paper in which the increase in thickness which is caused as the laminate paper is swelled in insulating oil is reduced without deteriorating the electrical and mechanical characteristics thereof. That is, the invention relates to a polyolefin laminate paper which is formed by combining at least one fiber paper layer, which has been embossed so that irregularities are formed thereon, with a polyolefin film layer, which is formed by a melting and extruding method, in order that the increase in thickness due to the swelling thereof is absorbed by flattening the irregularities of the fiber paper layer and polyolefin film layer thus combined.

In a conventional embossing method, a laminate paper obtained by combining fiber papers and a plastic film in advance is embossed later so that irregularities are mechanically formed thereon. Therefore, the thus-produced laminate paper often suffers from difficulties that it is locally damaged, and therefore its dielectric strength is lowered and the bonding strength of the fiber paper and the plastic film decreased.

Furthermore, in this after embossing method, it is difficult to provide irregularities in the laminate paper used as an insulating layer which are relatively small and sufficient to absorb the increase in thickness of the laminate paper which is caused when it is swelled in the oil. This is due to the following reasons: The Young's modulus in the widthwise direction of the laminate paper which is obtained by combining fiber papers and a plastic film is three or four times as large as that in the widthwise direction of the fiber papers only. Accordingly, an embossing pressure larger than the ordinary embossing pressure should be employed to emboss the laminate paper. However, if the embossing pressure is excessively large, then the laminate paper is greatly damaged, and its mechanical and electrical characteristics deteriorated. Furthermore, irregularities imparted to the laminate paper are larger in size than those which are just sufficient to absorb the increase in thickness of the laminate paper which is caused as it is swelled in the oil. Thus, the embossed laminate paper is not suitable as an electrical insulating material. Still further, the embossing member tends to wear quickly, and hence it is difficult to uniformly emboss laminate papers. On the other hand, if the embossing pressure is low, it is difficult to impart irregularities to the surfaces of the laminate paper Accordingly, it is difficult to maintain a suitable operating range in which minute irregularities are continuously imparted to a laminate paper to the extent that the mechanical characteristics and the dielectric strength are not lowered and the increase in thickness due to the swelling is suppressed. This makes it difficult to apply the embossed laminate paper in many common electrical equipment applications.

SUMMARY OF THE INVENTION

In view of the foregoing, the inventors have conducted intensive research on an embossed laminate paper and found a method of stably obtaining a novel embossed laminate paper having relatively small irregularities as required, without substantially changing the mechanical strength and the dielectric strength thereof.

The novel embossed laminate paper of the invention is obtained by embossing fiber papers in advance in such a manner that irregularities are imparted to the surfaces of the fiber papers. That is, the embossed laminate paper of the invention is a so-called pre-emboss type laminate paper. One of the serious difficulties accompanying an after-emboss type laminate paper is that the bonding strength of fiber papers and a polyolefin layer is considerably reduced by the destruction of anchoring in which is caused when the laminate paper is embossed later. However, the inventors have found that the bonding strength is increased by embossing the fiber papers prior to the lamination thereof, and consequently developed the invention. That is, the inventors have developed a method in which at least one embossed kraft insulating paper which is obtained by embossing a fiber paper, namely, a kraft insulating paper having an impermeability of 20 to 4000 Gurley-seconds and a thickness of at least 30 microns in such a manner that irregularities whose depth is 2 to 50% of the thickness of the base of the kraft insulating paper are formed thereon. The paper is supplied to a melting, extruding and laminating machine with the water content of the fiber paper adjusted to 4% or less, preferably to 2% or less, and more preferably to 1% or less, immediately before the laminating operation. The embossed kraft insulating paper is made integral with a polyolefin film layer formed by a melting and extruding method.

The inventors have thus succeeded in the provision of a pre-emboss polyolefin laminate paper having irregularities of suitable depth according to the thickness of the polyolefin film layer. That is, the inventors have succeeded in the provision of polyolefin laminate paper which is excellent both in mechanical and electrical characteristics and has relatively small irregularities.

DESCRIPTION OF THE PREFERRED EMBODIMENTS

With polypropylene being selected as a typical polyolefin, the features of the pre-emboss polyolefin laminate paper according to the invention will be described in comparison with those of conventional after-emboss polyolefin paper. For convenience in description, it is assumed that the polyolefin laminate paper is obtained by bonding plural sheets of kraft paper together with an adhesive, namely, a molten and extruded polyolefin layer.

Figure 3:
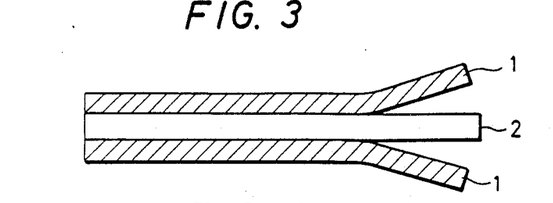
FIG. 3 is a schematic diagram showing a non-emboss type laminate paper.
Figure 4:
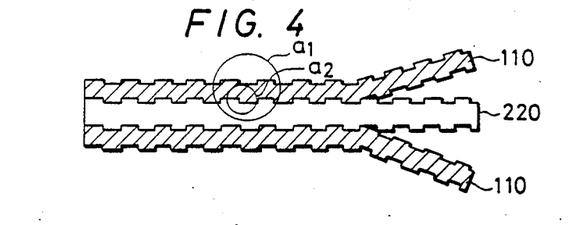
FIG. 4 is a schematic diagram showing an after-emboss type laminate paper.
Figure 5:
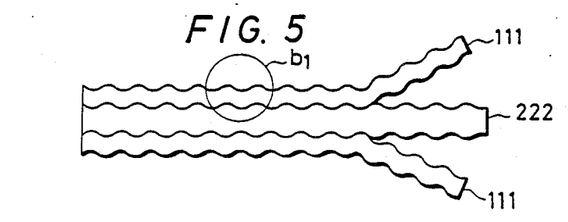
FIG. 5 is a schematic diagram showing a pre-emboss type laminate paper according to the invention.
Figure 6:
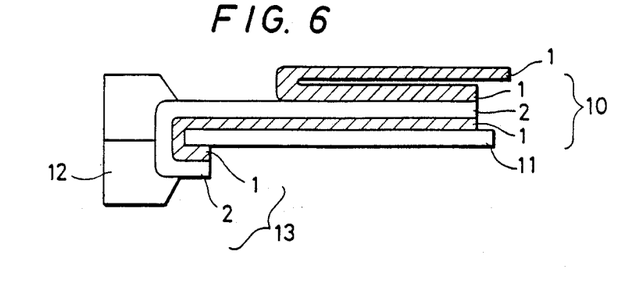
FIG. 6 is a sectional diagram of a test piece and a test piece mounting member used for a description of a method of measuring the bonding strength of the kraft paper layers and an extruded polyolefin layer of a laminate paper.

FIGS. 3 and 4 are schematic explanatory diagrams showing the conventional after-emboss polyolefin laminate paper. FIG. 5 is a schematic explanatory diagram showing the pre-emboss polyolefin laminate paper according to the invention.

The conventional after-emboss polypropylene laminate paper is manufactured as shown in FIG. 3. Plural sheets of fiber paper are combined together with a polypropylene binder which is obtained according to a polypropylene melting and extruding method. In FIG. 3, reference numeral 1 designates sheets of kraft paper; and 2, a molten and extruded polypropylene film layer. The sheets of kraft paper and the polypropylene film layer are bonded together to form a sheet of polypropylene laminate paper (PPLP). This manufacturing method is described in the specification of Japanese Patent No. 928405 in detail.

In this case, bonding the pieces of kraft paper and the polypropylene film layer is effected by allowing the molten polypropylene to flow into the surface fiber layers of the kraft papers, that is, by a so-called "anchoring method". Thereafter, the polypropylene laminate paper is subjected to embossing in a conventional manner, as a result of which, as shown in FIG. 4, the kraft papers 110 and the polypropylene film layer 220 are embossed in such a manner that the surfaces thereof are roughened. In general, the Young's modulus in the widthwise direction of the PPLP formed as shown in FIG. 3 is three or four times as large as that of kraft paper. Therefore, in order to emboss the PPLP as shown in FIG. 4, it is necessary to apply a relatively high stamping power thereto. Therefore, in FIG. 4, the area $a_1$ on the male side of the stamping machine, receiving high pressure locally, is liable to be mechanically permanently deformed or permanently damaged. On the other hand, in the area $a_2$ on the female side of the stamping machine, a strong shearing force is exerted on the kraft paper and the polypropylene film layer so that the molten polypropylene is caused to flow in the fiber layer of the kraft paper. As a result, the bonding strength of the PPLP which is kept integral by the anchoring effect is decreased considerably, and therefore the kraft paper can partially peel off. As the air permeability of kraft paper is increased, the anchoring effect is decreased, and the bonding strength is also decreased.

In the case where extremely thin insulating kraft paper, such as kraft paper typically used for capacitors and which is less than 30 microns in thickness, is used, the anchoring effect is decreased and the bonding strength is greatly reduced, due to the following reasons: In general, in machining such kraft paper, the pulp beating degree is increased to make the fibers thin compared with other kraft papers thicker than the aforementioned kraft paper. Furthermore, the kraft paper is subjected to calendering by rolling it outside the paper machine, if necessary, as a result of which the surfaces thereof are made smooth and the density and the impermeability thereof are increased. Therefore, in the use of the extremely thin insulating kraft paper, the anchoring effect is decreased and the bonding strength is greatly decreased. In this case, not only is the necessary bonding strength decreased (the mechanical characteristic is deteriorated), but also the breakdown voltage of the damaged part of the polypropylene film is decreased or oil gaps are formed in the parts peeled off, thus decreasing the overall breakdown voltage (the electrical characteristic is deteriorated).

The inventors have conducted research on how an embossed laminate paper absorbs the increase of thickness when insulating oil impregnates the polypropylene film to swell the later, and found that there are two mechanisms for absorbing the increase of thickness. In one of the two mechanisms, the irregularities of the kraft paper, serving as a cushion layer, absorb the increase of thickness while being leveled. In the other mechanism, in the part $a_1$ in FIG. 4, the irregularities of the interface between the kraft paper and the polypropylene film absorb the increase of thickness while being leveled. The action of this mechanism is important. In the PPLP shown in FIG. 4, the interface between the polypropylene film and the kraft paper is fundamentally flat, and it is merely bent irregularly. Accordingly, the polypropylene film interface is swelled in all directions, as a result of which the anchoring effect of the interface of the kraft papers is further decreased, and the bonding strength, which was already reduced before impregnation, is further decreased so that the kraft papers have a strong tendency to peel off the polypropylene film, and hence the number of oil gaps is increased. Thus, the mechanical and electrical characteristics of the PPLP are often deteriorated.

In the case where the PPLP is subjected to afterembossing, deep irregularities are formed in the surfaces of the laminate paper with a regular pitch. Therefore, in forming a laminated insulator, the upper and lower laminate papers are not satisfactorily combined. For instance, in the interface of two adjacent layers, protrusions on one of the two adjacent layers are liable to be engaged with recesses of the other layer, that is, a so-called collapse phenomenon is liable to occur, thus lowering the sliding characteristic, or a so-called "ride-on-the-waves phenomenon" in which the protrusions of one layer are regularly brought into contact with those of the other layer is liable to occur, thus making the laminate paper unstable. Furthermore, the number of sheets of insulating paper is decreased in proportion to the increase of thickness of the laminate papers due to after-embossing. Therefore, even if the polypropylene film is swelled by impregnation of insulating oil, the irregularities are not completely eliminated; the oil gaps between the laminate papers are not eliminated. Thus, the dielectric strength of the oil-impregnated power unit may be decreased. The characteristic of maintaining the irregularities unchanged is, in general, increased in the case where a hard paper, namely, a paper high in pulp beating degree and in impermeability, or an extremely thin paper which is made high both in pulp beating degree and in impermeability by calendering, is used as the fiber paper. The use of such paper is liable to make the above-described mechanical and electrical drawbacks more significant.

The degree of irregularities which is required to compensate for the swelling of the laminate paper in the insulating oil has been investigated by the inventors in detail. As a result, it has been found that, in the case of a laminate paper having a nominal dielectric characteristic of the order of dielectric constant $(\epsilon) \times$ dielectric loss angle $(\tan \delta) = (2.8 \text{ to } 2.5) \times (0.1 \text{ to } 0.04\%)$, it is most preferable that the final increase of thickness of the laminate paper by embossing be 2 to 5%. It is rather difficult to stably obtain such a small increase of thickness by after-embossing.

On the other hand, a feature of the pre-emboss PPLP of the invention resides in that the impermeability of the kraft insulating paper used as the fiber paper is 20 to 400 Gurley-seconds. (This paper is hereinafter referred to as a low impermeable paper, when applicable).

The reason why the lower limit of the impermeability is set to 20 Gurley-seconds (G.-sec) is that, when the impermeability is lower than this value, the desired bonding strength is increased, but the impulse withstanding breakdown is greatly decreased. The reason why the upper limit of the impermeability is set to 4000 G.-sec is that, if the impermeability is higher than this value, the bonding strength may not be improved. As is well known in the art, in the case of kraft insulating paper, the impermeability is closely related to the impulse breakdown strength. Accordingly, in the case of kraft insulating paper, in order to use it for insulation of ultra-high voltage cables, it is desirable to increase the impermeability as much as possible, that is, it is desirable to increase it to at least 3000 G.-sec. However, in the case of polypropylene laminate paper, the electrical breakdown characteristic is somewhat enhanced by the polypropylene film layer between the kraft insulating paper layers, and therefore even if the impermeability is considerably decreased, the impulse breakdown strength of the entire laminate paper is not so greatly reduced.

In the case of laminating kraft insulating papers made according to a polypropylene resin melting and extruding method, if the impermeability of the kraft insulating papers is lower than that of the conventional papers, then a polypropylene laminate paper having a bonding strength sufficiently strong in practical use can be manufactured. Furthermore, if the impermeability is set to a certain value or higher, then the impulse breakdown strength and the mechanical strength are increased compared with those of a laminate paper using the conventional high impermeable kraft insulating paper The thickness of a kraft paper used as a low impermeable fiber paper is preferably at least 30 microns. When a kraft paper having the above-described bonding strength and a low impermeability of 20 to 4000 G.-sec is embossed, in order for the kraft paper to be embossed without damage and the kraft paper thus embossed maintained unchanged in shape, it is necessary that the kraft paper have a certain thickness It has been found by the inventors that this thickness is about 30 microns. The absorption of swelling of the pre emboss PPLP is determined by the cushion effect of the kraft paper itself and the degree of roughness of the kraft paper.

Accordingly, if, in the case of the pre-emboss PPLP, the thickness of the kraft paper is smaller than a certain value, then it is impossible to impart a necessary surface roughness thereto without mechanical damage, and therefore it is difficult to completely absorb the swelling. Thus, the thickness of the kraft paper is an essential factor. Accordingly, in the above-described polyolefin laminate paper of a class of $\epsilon \times \tan \delta + (2.8 \text{ to } 2.5) \times (0.1 \text{ to } 0.04)$, the low impermeable kraft papers used should have a certain thickness. It has been found by the inventors that this thickness is about 30 microns. In the case of thin kraft insulating paper, if the impermeability is increased, or if the surface smoothness is increased, the bonding strength of a plastic film layer and kraft papers to be laminated is decreased. However, the difficulty can be eliminated by selecting kraft papers whose thickness is about 30 microns or more.

In the pre-emboss PPLP of the invention, plural sheets of kraft paper having the above-described features are stamped in a conventional manner so that irregularities are formed on their surfaces before they are combined into a laminated paper. In this step, the Young's modulus in the widthwise direction of the kraft papers is small, and the kraft papers can be stamped with a relatively small pressure. Therefore, the embossing rolls of the stamping machine do not wear as fast as in the conventional case. That is, the kraft papers can be stamped as required while being free from damage.

The kraft papers thus stamped are combined together with molten polypropylene as a binder, as a result of which a PPLP as shown in FIG. 5 is obtained. For the case where two kraft insulating papers stamped to provide a maximum thickness increase percentage of 21% and containing about 6% of the moisture in the fiber paper are laminated with a binder of molten polypropylene under a controlled pressure, the collapse of the irregularities and the bonding strength of the kraft insulating papers and the polypropylene film layer have been investigated by the inventors. The results of this investigation are indicated in FIG. 1 and 2.

Figure 1:
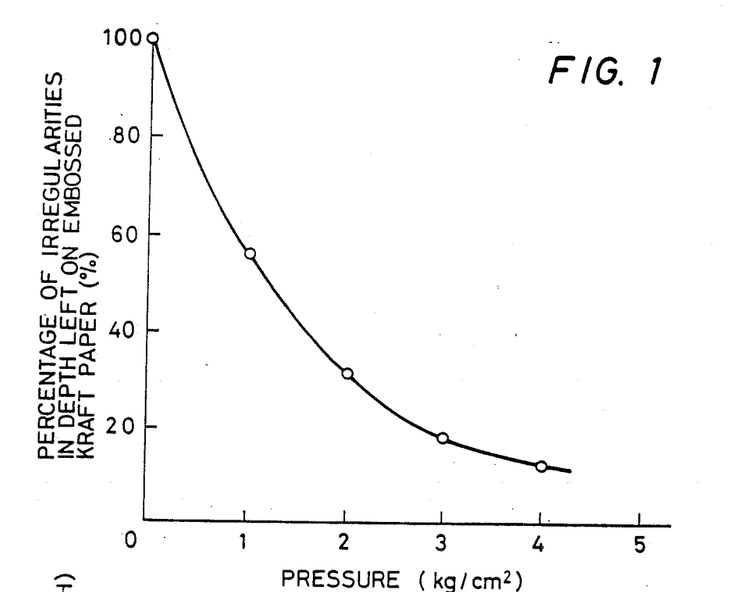
FIG. 1 is a graphical representation indicating pressures used for bonding embossed kraft papers together with molten polyolefin with the depths of irregularities remaining on the embossed kraft papers.
Figure 2:
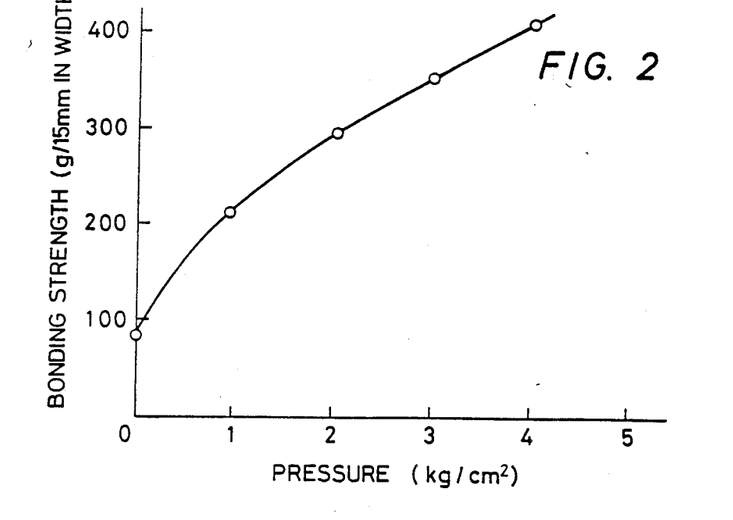
FIG. 2 is a graphical representation indicating pressures used for bonding embossed kraft papers together with molten polyolefin with bonding strengths of the kraft papers and the polyolefin film layer after the lamination.

As is apparent from FIGS. 1 and 2, as the pressure is increased in the laminating operation, the bonding strength is considerably increased, but the surface roughness of the embossed kraft paper is decreased. This means that a desired surface roughness can be obtained by controlling the pressure applied by the pressurizing roller in the laminating operation. However, it is difficult to form a laminate paper merely by controlling the pressure of the pressurizing roller, which has a large bonding strength and relatively large irregularities. This tendency is significant especially in the use of kraft papers of low impermeability and relatively small thickness.

The inventors have conducted further research on laminate paper and found the following: Originally, a low impermeable paper is low in stiffness. The stiffness of the paper depends on the quantity of moisture contained therein. The stiffness of the low impermeable paper is greatly affected by moisture. This tendency is significant with a thin kraft insulating paper less than 30 microns in thickness because the absolute surface roughness afforded thereto is small.

Figure 7:
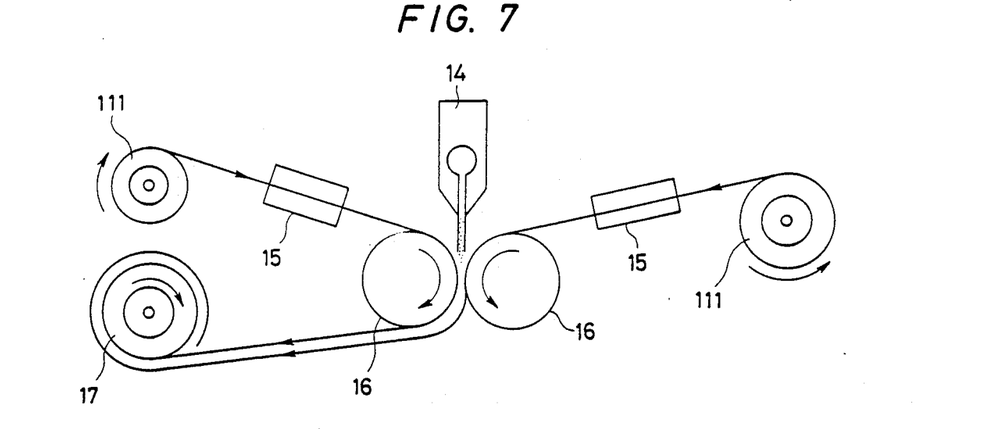
FIG. 7 is an explanatory diagram used for a description of a method in which preheaters are provided to control the water contents of embossed kraft papers immediately before a laminating operation.
Figure 8:
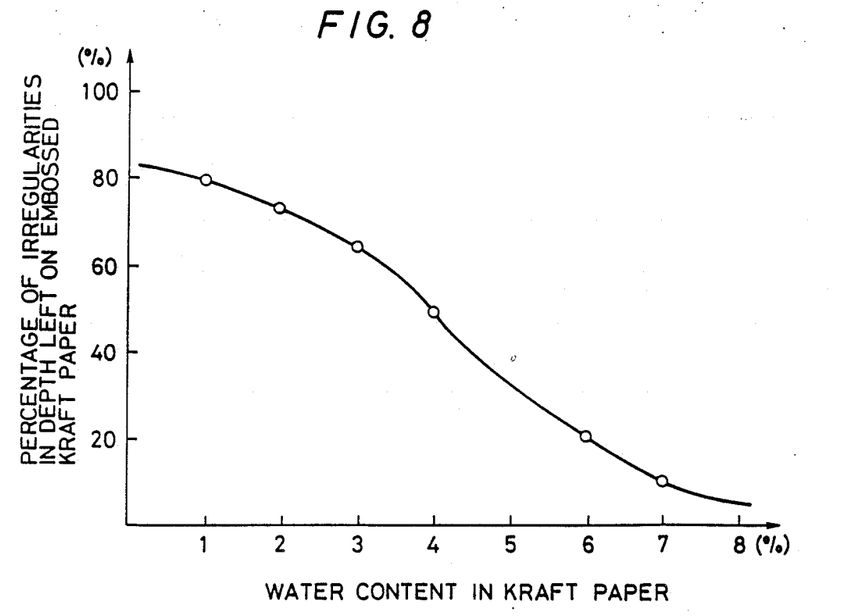
FIG. 8 is a graphical representation indicating water contents of embossed kraft papers which have been controlled by preheaters as a function of depths of irregularities remaining on the embossed kraft papers.

The inventors have investigated the percentage of irregularities left on an embossed kraft paper, using a pressure fixed at 3 kg/cm$^2$, wherein the quantity of water content in the kraft paper was varied. In this investigation, as shown in FIG. 7, two embossed kraft papers 111 were supplied, preheaters, namely, infrared heaters, were arranged immediately before an extruder, and the heating temperatures were controlled to change the quantities of moisture in the kraft papers. The results of the investigation are as indicated in FIG. 8. The graph in FIG. 8 indicates that, in the range of low stiffness, the irregularities are deformed and made small by the tensile force exerted on each embossed laminate paper during the laminating operation. Under this condition the papers are combined together with a molten binder, as a result of which the number of irregularities formed is decreased. Accordingly, in order to obtain a laminate paper which has a suitable bonding strength and irregularities as required, in the case where low impermeable papers or thinner papers are used, it is preferable that, immediately before the laminating operation, the fiber paper be dried appropriately by heating so that the water content of the kraft paper is 4% or less, preferably 2% or less, and 1% or less if necessary.

The finding of the fact that controlling the moisture content of the kraft papers by preheaters before the laminating operation is effective for manufacturing the embossed PPLP is considerably useful for allowing the manufacture of embossed PPLPs on a large scale.

In general, the increase of thickness of a polyolefin film layer due to swelling in the insulating oil is greatly affected by the film manufacturing conditions, the application of heat treatment, and the film use conditions. However, in the case where an insulating oil of the hydrocarbon type is used at an ordinary temperature (80° to 100° C.), the increase of thickness is of the order to 5 to 25% of the thickness of the film. Accordingly, it is preferable that the increase of thickness of the laminate paper due to the increase of thickness of the film be estimated according to the actual conditions of use, and irregularities necessary for absorbing the increase of thickness formed on the kraft papers accordingly.

This will be described in more detail. In order to manufacture a PPLP having electrical characteristics and a thickness as desired, the type of a polypropylene film layer and the type and thickness of two kraft papers laid on both sides of the film layer are determined accordingly. In order to increase the thickness of the laminate paper by irregularities while a laminate pressurizing force is maintained to the extent that the bonding strength is maintained unchanged, the percentage of increase in thickness due to the pre-embossing of the kraft papers is determined in consideration of the laminate pressurizing force, and the percentage of increase in thickness is obtained by controlling the pressure of the embossing roll and by controlling the quantities of water content in the kraft papers with the heaters.

The PPLP is schematically as shown in FIG. 5. In FIG. 5, reference numeral 111 designates the kraft papers, and reference numeral 222 designates the molten and extruded polypropylene film which serves as a binder. In the area $b_1$ in FIG. 5, no peeling force due to embossing is exerted on the interface between the kraft paper and the polypropylene film, and the number of irregularities of the kraft paper is increased in the interface. Therefore, the anchoring effect which is obtained by allowing the polypropylene to engage with the irregularities is improved In association with the use of the low impermeable paper, the bonding strength is remarkably improved In the case where the PPLP shown in FIG. 5 is swelled in the insulating oil, the interface between the kraft paper and the polypropylene film is uneven originally, and therefore the polypropylene is swelled in various directions. Accordingly, as described before, in this part, the swelling absorbing effect is high, and the force of peeling the polypropylene film off the kraft paper by swelling is distributed. Thus, even when the PPLP is kept in the oil, the bonding strength will not be reduced.

As described above, the bonding strength is maintained, not only after the laminating operation, but also after impregnation with insulating oil, and therefore the PPLP is free from the problem of the kraft paper peeling off the polypropylene film and forming oil gaps and thus lowering the dielectric strength. Furthermore, the area $b_1$ in FIG. 5 is considerably irregular and small when compared with the area $a_1$ in FIG. 4. Therefore, the area $b_1$ does not suffer the difficulty that, as in the case of the PPLP in FIG. 4, the polypropylene film layer is locally thinned and the electrical insulating characteristic is therefore lowered In this point, the area $b_1$ is superior to the area $a_1$. Since fiber papers which are stamped to have irregularities are used, the arrangement of irregularities on one side of the laminate paper will not coincide with that of irregularities on the other side of the laminate paper. In addition, as the pre-emboss fiber papers are laminated while being pulled and pressurized, the irregularities on both sides of the laminate papers are arranged essentially irregularly. Accordingly, in forming an insulator by laminating the pre-embossed PPLPs shown in FIG. 5, the upper and lower PPLPs are well engaged with each other when compared with the PPLP shown in FIG. 4. Furthermore, as low impermeable papers are used, the irregularities of the kraft papers, after being oil-impregnated, absorb the swelling of the polypropylene film layer and therefore the irregularities are readily collapsed. Accordingly, after the swelling has been absorbed, unwanted residual oil gaps are not formed between the insulting paper tapes. Therefore, the surface cf the insulator is scarcely distinguishable from the surface of an insulator which is formed by laminating non-embossed PPLPs; that is, the surface of the insulator is electrically satisfactory.

As described above, in the inventive laminate paper, unlike the after-embossed PPLP, the irregularities on one side thereof are not coincident with those on the other side; that is, the irregularities are arranged irregularly. Therefore, the laminate paper is free from the collapse phenomenon and the "ride-on-the-wave" phenomenon, and the interface between the insulating papers is maintained stable. Low impermeable papers are employed as the kraft papers, as was described above. Therefore, although insulating paper tapes of the invention are stably and uniformly combined together after absorbing the swelling, the insulating oil moves smoothly between the insulating layers. Thus, the laminate paper will not suffer from the difficulties of other PPLPs.

In the case of the after-embossed PPLP, the embossing operation is mechanically carried out after the laminating operation. Therefore, if it is stored for a long period, the irregularities thereof are liable to be restored (flattened) by the elasticities of the kraft papers and the polypropylene film; that is, the surface roughness may be decreased. However, in the case of the pre-embossed PPLP according to the invention, the configuration is determined by the interface between the polypropylene film and each kraft paper during the laminating operation, and therefore the irregularities are scarcely flattened. In this point, the pre-embossed PPLP according to the invention is considerably excellent in practical use.

In order to clarify the effects of the laminate paper according to the invention, specific examples thereof will be described.

EXAMPLE 1

A kraft insulating paper having a thickness of 43 microns and a impermeability of 3000 G.-sec was passed through 40-mesh embossing rolls to form an embossed kraft insulating paper having a thickness of 52 microns (the thickness increase percentage was 20.8%). Two embossed kraft papers thus formed were laminated with a molten polypropylene binder which was formed by the melting and extruding method. In this operation, the water content of each kraft insulating paper was maintained at 2%.

Furthermore, the thickness of the binder, that is, the thickness of the polypropylene layer, was adjusted to about 100 microns, and the resultant laminate paper was 190 microns in thickness. The bonding strength was 260 g/15 mm in the widthwise direction.

Ten pre-emboss laminate paper sheets thus formed were subjected to humidity adjustment in a standard atmosphere, at a temperature to 22° C. and a relative humidity of 65%, for twenty-four hours. The laminate papers thus treated were piled on one another and were dried at a temperature of 100° C. under a pressure of 1 kg/cm$^2$ for twenty-four hours. Then, the laminate papers were immersed into DDB (hard type alkyl benzene) held at 100° C. The thickness increase percentage of the laminate papers saturated was 0.0%. In this case, the bonding strength was 212 g/15 mm width, and the AC short-time breakdown strength and the impulse breakdown strength of each paper were 129 kV/mm and 241 kV/mm, respectively.

COMPARISON EXAMPLE 1

Two kraft insulating papers 43 microns in thickness of the same general type as in Example 1 were processed directly by the melting and extruding method. In this case the thickness of a binder, namely, a molten polypropylene layer, was 100 microns. The thickness of the resultant laminate paper was 172 microns. The bonding strength of the laminate paper was 132 g/15 mm width.

The laminate paper thus formed was passed through 40-mesh embossing rolls to form an after-emboss laminate paper 187 microns in maximum thickness (the thickness increase percentage was 8.9%). The bonding strength was found to have decreased to 82 g/15 mm width. The laminate paper thus treated was immersed in oil under the same conditions as those in Example 1. The thickness increase percentage of the laminate paper saturated with oil was 0.51%. In this case, the bonding strength was 40 g/15 mm width, and the AC short-time breakdown strength and the impulse breakdown strength were 108 kV/mm and 108 kV/mm, respectively.

EXAMPLE 2

An embossed kraft insulating paper 47 microns in maximum thickness (the thickness increase percentage being 9.0%) was formed. Two embossed kraft insulating papers thus formed were laminated with a binder, namely, a molten polypropylene layer, about 55 microns in thickness, to form a laminate paper 136 microns in thickness. In this case, the bonding strength was 153 g/15 mm width.

The pre-emboss laminate paper was immersed in oil, and the thickness increase percentage of the pre-emboss laminate paper saturated with oil was −2.0%. In this case, the bonding strength was 112 g/15 mm width, and the AC short-time breakdown strength and the impulse breakdown strength of each sheet were 141 kV/mm and 258 kV/mm.

COMPARISON EXAMPLE 2

Two kraft insulating papers, each 43 microns in thickness, were laminated with a molten polypropylene binder whose thickness was adjusted to about 55 microns to form a laminate paper 127 microns in thickness.

In this case, the bonding strength of the laminate paper thus formed was 82 g/15 mm width. The laminate paper was passed through 40-mesh embossing rolls to obtain an after-emboss laminate paper 140 microns in maximum thickness (the thickness increase percentage was 10.1%). In this case, the bonding strength was decreased to 58 g/15 mm width.

The laminate paper as immersed in oil, and the thickness increase percentage of the laminate paper saturated with oil was −1.25%. The bonding strength was 22 g/15 mm width, and the AC short-time breakdown strength and the impulse breakdown strength of each sheet were 127 kV/mm and 191 kV/mm, respectively.

EXAMPLE 3

A kraft insulating paper having a thickness of 70 microns and an impermeability of 2700 G.-sec was passed through 40-mesh embossing rolls to form an embossed kraft insulating paper 103 microns in maximum thickness (the thickness increase percentage was 47%).

With a molten polypropylene binder whose thickness was adjusted to about 120 microns, the aforementioned embossed kraft insulating paper 103 microns in thickness and the embossed kraft paper formed in Example 1 were bonded together (with the water content of each kraft paper maintained at 2%) to obtain a laminate paper 241 microns in thickness. In this case, the bonding strength on the weak side (the side of the 52 micron kraft paper) was 193 g/15 mm width.

The pre-embossed laminate paper was immersed in oil, and the thickness increase percentage of the pre-emboss laminate paper saturated with oil was 0.23%. In this case, the bonding strength on the weak side was 177 g/15 mm width, and the AC short-time breakdown strength and the impulse withstanding strength of each sheet were 127 kV/mm and 229 kV/mm, respectively.

COMPARISON EXAMPLE 3

Using the melting and extruding method, a kraft insulating paper 70 microns in thickness and a kraft insulating paper 43 microns in thickness were bonded together with a molten polypropylene binder, the thickness of which was adjusted to about 120 microns, to form a laminate paper 220 microns in thickness. In this case, the bonding strength on the weak side, namely, on the side of the kraft paper 43 microns in thickness, was 89 g/15 mm width. Thereafter, the laminate paper was passed through 40-mesh embossing rolls to obtain an after-embossed laminate paper 240 microns in thickness (the thickness increase percentage was 9.0%). In this case, the bonding strength was decreased to 73 g/15 mm width on the side of the kraft paper 43 microns in thickness. The after-embossed laminate paper was immersed in oil, and the thickness increase percentage of the after-embossed laminate paper saturated with oil was 1.92%. In this case, the bonding strength was 35 g/15 mm width on the side of the kraft paper 43 microns in thickness, and the AC short-time breakdown strength and the impulse breakdown strength of each sheet were 97 kV/mm and 165 kV/mm, respectively.

COMPARISON EXAMPLE 4 (COMPARISON WITH EXAMPLE 1)

A kraft insulating paper having a thickness of 43 microns and an impermeability 3000 G.-sec was passed through 40-mesh embossing rolls to form an embossed kraft insulating paper 52 microns in maximum thickness (the thickness increase percentage was 20.8%). Two embossed kraft insulating paper sheets thus formed were laminated with a molten polypropylene binder employing the melting and extruding method illustrated in FIG. 5. In this operation, the preheaters were not used; that is, the water content of each paper was not removed The thickness of the binder (the thickness of the polypropylene layer) was adjusted to about 100 microns, and the produced laminate paper was 185 microns in thickness. In this case, the bonding strength was 212 g/15 mm width.

The pre-embossed laminate paper was subject to humidity adjustment in a standard atmosphere having a humidity of 65% at a temperature 22° C. for twenty-four hours. Ten pre-embossed laminate paper sheets thus treated were piled on one another and then dried at a temperature of 100° C. under a pressure of 1 kg/cm² for twenty-four hours. The laminate paper thus dried was immersed in DDB (hard type alkyl benzene) at 100° C. The thickness increase percentage of the laminate paper saturated with DDB was 0.92%. At that time, the bonding strength was 196 g/15 mm, and the AC short-time breakdown strength and the impulse breakdown strength were 130 kV/mm, and 243 kV/mm, respectively.

The results of the above-described examples are collectively indicated in the following Table 1:

TABLE 1

| Specimen No. | Kraft paper thickness (μm) | Kraft paper water content | Thickness increase percentage by embossing (%) Embossed kraft paper | Thickness increase percentage by embossing (%) Embossed PPLP | PPLP thickness (μm) | Molten polypropylene film layer thickness (μm) | PP percentage (%) | Bonding strength (g/15 mm width) | Mechanical** characteristic Thickness increase percentage after saturation (%) | Mechanical** characteristic Bonding strength (g/15 mm width) | Electrical*** characteristic AC short-time breakdown strength (kV/mm) | Electrical*** characteristic Impulse breakdown strength (kV/mm) |
|---|---|---|---|---|---|---|---|---|---|---|---|---|
| Example 1 | 43 | 2% | 20.8 | — | 190 | 100 | 52.6 | 206 | 0.0 | 212 | 129 | 241 |
| Comparison Example 1 | 43 | — | — | 8.9 | 187 | 100 | 53.4 | 82 | 0.51 | 40 | 108 | 108 |
| Example 2 | 43 | 2% | 9.0 | — | 136 | 55 | 40.4 | 153 | −2.0 | 112 | 141 | 258 |
| Comparison Example 2 | 43 | — | — | 10.1 | 140 | 55 | 39.3 | 58 | −1.25 | 22 | 127 | 191 |
| Example 3 | 43 70 | 2% | 20.8 47.0 | — | 241 | 120 | 49.9 | weak side 193 | 0.23 | weak side 177 | 127 | 229 |
| Comparison Example 3 | 43 70 | — | — | 9.0 | 240 | 120 | 50.0 | weak side 73 | 1.92 | weak side 35 | 97 | 165 |
| Comparison Example 4 | 43 | 6.5% | 20.8 | — | 185 | 100 | 64.9 | 212 | 0.92 | 196 | 130 | 243 |

(Note 1) *indicates characteristics with a relative humidity of 65% at a temperature of 22° C.
(Note 2) **indicates the characteristic of a laminate paper saturated with DDB (hard type alkyl benzene) at 100° C.
(Note 3) ***indicates the characteristics of a laminate paper immersed in DDB (per sheet).
(Note 4) A 45 μm kraft paper has an air resistance of 3000 G.-sec and a 70 μm kraft paper has an air resistance of 2700 G.-sec.
(Note 5) The thickness of a molten polypropylene film layer is obtained by dividing the unit-area weight by the density (0.9) of PP.

As is apparent from the above-described Examples, in the pre-embossed laminate paper formed by laminating embossed kraft papers having a low impermeability and a thickness of at least 30 microns with the water content thereof adjusted to 2% immediately before the laminating operation, the bonding strength is remarkably improved. Thus, the mechanical characteristic of the pre-embossed laminate paper is satisfactory. In addition, the dielectric strength is not decreased by the embossing operation. That is, the electrical characteristics of the pre-embossed laminate paper is also satisfactory. Furthermore, according to the thickness of the binder (or the polypropylene film layer), irregularities are formed on the laminate paper in a necessary quantity. This means that the increase of thickness of the laminate paper is suppressed, and yet local damage of the laminate paper is minimized.

The water contents of the embossed laminate papers are controlled by the preheaters immediately before the laminating operation. Therefore, variations in embossing of the embossed laminate papers are corrected, and pre-embossed PPLP of stable quality can be manufactured. Especially where the water content is limited to 4% or less, even low impermeable paper whose irregularities are liable to be collapsed, or papers thinner than the low impermeable papers, can be laminated to form a pre-embossed PPLP without greatly deforming the irregularities and decreasing the bonding strength. Thus, the method of controlling the water contents of embossed laminate papers by the preheaters immediately before the laminating operation is considerably effective.

The pattern formed on the pre-embossed PPLP is maintained unchanged longer than that formed on the after-embossed PPLP. That is, the irregularities of the pre-embossed PPLP are not deformed, even if the pre-embossed PPLP is stored for time periods. Thus, the pre-embossed PPLP is considerably practical.

The method of manufacturing an embossed laminate paper may be a method in which, employing a so-called "tandem system" in which embossing rolls are used in combination with a melting and extruding type laminating machine, fiber papers such as kraft papers are embossed, and using a melting and extruding method, the papers thus embossed are bonded together with a molten polyolefin binder while the water contents of the papers are controlled. Otherwise, a method may be used in which fiber papers are embossed by an independent embossing machine and the papers thus embossed are laminated together by an extrusion type laminating machine with a molten polyolefin binder.

In the above-described examples, only a polypropylene binder is employed; however, it goes without saying that binders of the polyolefin group such as polyethylene binders or polybutene binders can be used in the same way.

As is apparent from the above description, the employment of the invention makes it possible to manufacture on a large scale insulating laminate papers, excellent both in electrical and mechanical characteristics, without using expensive equipment.

Great advantages may be obtainable by applying the insulating polyolefin laminate paper as described above to an oil-filled electric power supply cable. One embodiment of the oil-filled cable (OF cable) according to the present invention will be described in which polypropylene laminate papers (PPLP) subjected to pre-embossing are used as a typical example.

According to a conventional PPLP insulation OF cable, the PPLP is previously provided with water substance to swell a kraft paper layer beforehand, and thickness increase due to swelling of the PPLP in the insulating oil can be absorbed because of the decrease of thickness upon drying of the kraft paper layer, so that resultant thickness increase is avoidable. Alternatively, swelling is absorbed by so-called "after-embossing method ". However, according to the former method ( water substance application to control moisture ), it would be very costly to finish and maintain the PPLP. Further, special treatments are required such as paper winding in a moisture control chamber and long time drying, so that workability is lowered and resultant cable becomes costly.

In case of the latter method (after-embossing method), it would be difficult to provide constant embossing amount of PPLP as described above, so that a cable having uniform quality along its length may not be obtainable. Further, in the resultant cable, peeling may occur between craft paper of PPLP and polypropylene (PP) film. As a result, it would be difficult to provide a cable having excellent mechanical and electrical characteristics.

On the other hand, according to the present invention, pre-embossing PPLP is employed, to thus obviate the above mentioned drawbacks and to provide OF cable having stabilized quality without increasing production cost.

Regarding the insulating oil for use in the cable of the invention, the inventors have found that alkybenzenes containing an aromatic ring, particularly DDB (dodecyl benzene), which is commonly used in cables having insulation sheets only, best suits the purpose of the invention. Generally, the following conditions are adopted as criteria for selecting the insulating oil:

(A) The oil should be readily available at low cost.

(B) The oil should possess excellent and stable electrical properties.

(C) The oil should be highly compatible with the component materials of the insulating layer of the cable. Specifically, in the case of the invention, the oil should be amply compatible with the PP film.

Regarding conditions (A) and (B), DDB proves to be an ideal insulating oil. With respect to condition (C), however, DDB is not ideal in that it causes swelling of the PP film of the PPLP.

Generally, the degree of compatibility between a film and insulating oil is determined by their respective SP values (index of solubility); the similarity between the film and the insulating oil in a particular combination increases and the ability of the insulating oil to swell the film also inceases as the SP values of the film and the insulating oil approach each other Both PP and DDB have SP values approximating 8. Thus, their combination has been heretofore held to be less desirable than the other combinations, such as PP and polybutene oil or PP and silicone oil, because it has high mutual compatibility and entails a high degree of swelling.

After much study in this respect, the inventors have found that, since the swelling of the PP film by the insulating oil is caused by this oil penetrating the amorphous phase of the film, the fortification of the amorphous phase, which constitutes one electrically weak point of the PP film, renders the insulating oil in the combination susceptible to heavy swelling of the PP film more desirable from the electrical point of view. Moreover, DDB proves all the more desirable electrically in the sense that it possesses a benzene ring which causes it to excel in gas absorbing properties and resistance to corona discharge. According to the inventor's studies, the impulse beakdown value of one PP film layer, with the value in the combination with DDB taken as unity (1), is above 0.8 in the combination with polybutene, and 0.6 to 0.7 in the combination with silicone silicone oil. This trend applies to the AC breakdown strength of the PP film. For the outstanding electrical properties of DDB in combination with the PP film to be retained intact without any sacrifice of the compatibility of the DDB with the PP film, the following solution has been devised:

Since, as described above, thorough impregnation of the PP film of PPLP with DDB is advantageous from the standpoint of electrical properties, the cable is left standing at the maximum expected actual working temperature (generally in a range of 85° to 95° C.) for 24 to 48 hours to allow the PP film to swell to saturation prior to the shipment of the cable. This condition is effective to ensure the cable possesses good electrical properties from the outset of its service.

The inventors have studied in detail a relation between the embossing amount and the swelling-absorbing amount of the PPLP as follows.

An embossing amount of one kraft paper, for example, is prepared to be largely in a range of 30 to 50 microns However, if both of the two kraft papers are embossed to be, for example, in a range of 15 to 40 microns, the resultant PPLP possesses a sufficient embossing amount. Therefore, if the sufficiently embossed PPLP is disposed on an upper or a lower surface of another plain PPLP i.e., PPLP which is not treated by any embossing and moisture control, such the PPLP is employable to the cable because the PPLP employed to the cable has a sufficient amount of swelling to be absorbed by the bosses in an oil. Accordingly, it has been found that the cable having an extremely high quality could be produced by using the PPLP.

As mentioned above, if a cable is produced by disposing the pre-embossed PPLP on the plain PPLP one after another, a half of the entire insulating layer of the cable may be constituted with plain PPLPs. Therefore, the costly pre-embossed PPLPs become a half as compared with the usual case. It has been found that the cable could be produced at an extremely low cost.

The inventors have further developed this idea and found the following result.

An insulating layer entirely winding a conductor is constituted in such a manner that two or three sheets of the plain PPLP are sandwiched between two sheets of the pre-embossed PPLPs. It has been found that the cable using the insulating layer can sufficiently absorb the amount of swelling dependent to a voltage class, i.e., a thickness of the insulating layer, and an insulating oil to be employed by controlling the pre-embossing amount. In this case, the cost of insulating materials can be advantageously and further reduced.

The inventors have further improved the breakdown property of the cable as follows. Specifically, they have found it highly desirable to use sheets of kraft paper having a high dielectric constant and high resistance to corona discharge in several, for instance, three to ten, lowermost plies closest to the conductor and consequently subjected to the most electric stress. With this technique, particularly the positive impulse strength of the cable can be improved without suffering any discernible rise of the value of $\epsilon \cdot \tan\delta$ of the cable as a whole.

Figure 9:
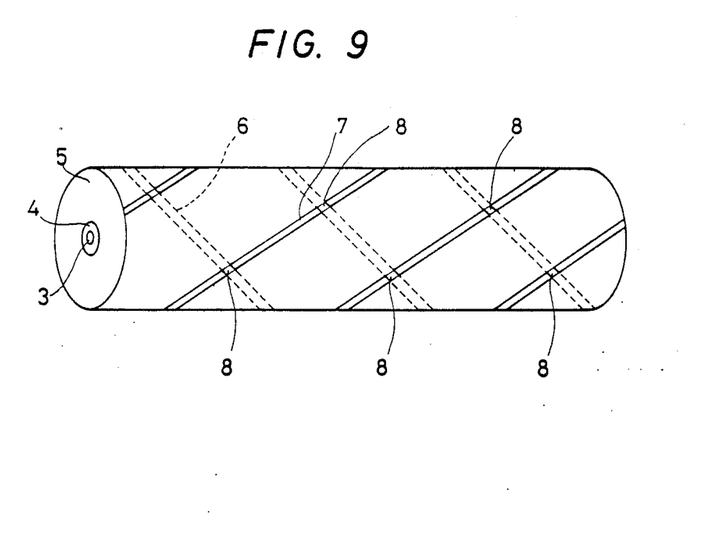
FIG. 9 is a perspective view of an oil-immersion insulating layer in the oil-immersion insulated electric power cable of FIG. 10.

FIG. 9 is a perspective view of the oil-immersion insulating layer in the oil-immersion electrically insulated cable. In the diagram, 3 denotes the conductor, 4 denotes a layer of plies of kraft paper, 5 denotes layers of plies of draft and PPLP, 6 denotes a lower (left-hand) oil-immersion insulating layer, 7 an upper (right-hand) oil-immersion insulating layer, and 8 a portion where a change of layers (change of taping head) occurs in the gap winding oil-immersion insulating layer and where the depth of the oil gap equals the thickness of two plies of tape. This particular portion constitutes another weak point of the cable.

Figure 10:
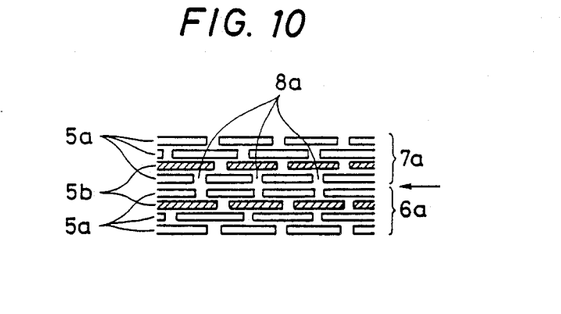
FIG. 10 is a cross section of a typical insulation structure contemplated by the invention, illustrating in an enlarged view a portion of the oil-immersion insulating layer involving a change of layer structure.

To overcome this weak point, the present invention uses tapes of kraft paper, as shown in FIG. 10 in the plies destined to be exposed to the portions 8a of the layer change in the oil-immersion insulating layer (the portions indicated by the arrow in FIG. 10) where the depth of the oil gap equals the thickness of two plies of tape, so that any local breakdown of the oil gap 8a will be prevented from readily developing into total breakdown of the cable by the barrier effect of the kraft paper 5b facing the portion 8a. 7a designates layers of plies with right-hand winding and 6a designates layers of plies with left hand winding. In FIG. 10, plies of PPLP 5A are used at the vicinity of layer changes. Optionally, these two plies may be formed of kraft paper so that a total of four plies are present, two above and two below each point of change of layer. This structure has been demonstrated to be quite effective. Arranging plies of kraft paper at areas of layer change is more effective closer to the conductor side where the electric stress is prominent. Where the mixing ratio of kraft paper is desired to be lowered to reduce the value of $\epsilon \cdot \tan\delta$, it is advantageous to adopt this approach at the areas of layer change in only the lowermost five or so layers from the boundary of the conductor.

Concerning particularly the reduction of the positive impulse property, which demands due attention in the application of the pre-embossed PPLP to the cable, improvements are attained notably by the arrangement of the kraft paper. These improvements add all the more to the effectiveness of the cable of the present invention.

The amount of surface coarsening of the pre-embossed PPLP and kraft paper contemplated by this invention varies widely with the class of voltage, the size of the conductor, the kind of the cable, and the insulating oil to be used. It is particularly affected by the combination of the specific combination of the PPLP and insulation oil.

In the cable of the present invention, the combination of PPLP with DDB has been demonstrated to enable the cable to attain excellent electrical properties, although other insulating oils can also provide excellent results. For a POF cable, for example, polybutene-type insulating oils of high viscosity are most often used. When such an insulating oil is used, since the amount of swelling of the pp film is small, it suffices to form bosses of a size of 2 to 10 microns, for example, only on the sheets of one sided kraft paper. Of course, it otherwise suffices to form bosses of a size of about 5 microns only on the sheets of both sided kraft paper.

The appropriateness was determined by holding a given cable at the highest working temperature (85° C. to 95° C., for example) for 24 hours, thereby to amply swell the layer of pp film, then bending the cable twice alternately in opposite directions into a loop of a diameter about 20 times the outermost diameter of the insulating layer, and disassembling the cable and visually examining the insulating tapes in the insulating layer for possible sign of irregularities.

Furthermore, the inventors have been developing a technique by which the appropriateness is determined by a solidity of the insulating layer. It is being developing that the reliability of the cable insulating layer, the coarsening amount of kraft paper of the PPLP and the appropriateness of the taping condition are determined by an appropriate solidity given to the insulating layer after swelling of the PPLP.

In any event, it is essential that cable be manufactured by setting the amount of surface coarsening in the range of 1 to 50 microns, depending on the application of the cable and the type of insulating oil, and that the taping conditions be coordinated with the selected amount of surface coarsening Once the cable is produced, it is then desirable and necessary to have the pp film swell and be subjected to the bending test the highest working temperature of the cable. Further, in case of OF cable having a metal sheath, in order to connect one with another, its joint portion is subjected to a soldering or solder wiping procedure in metal to metal. Usually, a melting point of a solder to be employed therefor is in a range of 200° to 300° C. Therefore, during the soldering process, it may occur that polyolefin of the insulating polyolefin laminate paper immediately beneath the metal sheath is melted outwardly therefrom because polyolefin has a low melting point. Accordingly, in the case of a production of the OF cable accompanying the soldering process, it is preferable that a part of the insulating layer which has a thickness of 2 to 6 mm measured from the inner wall of the metal sheath is substituted with an anti-soldering insulating material.

At that time, as a constituent of the 2 to 6 mm insulating material to be substituted, it may be preferbly selected from at least one of kraft paper, poly-4-methylpentene laminate paper using poly-4-methylpentene high melting point), fluoroethylene-propylene laminate paper using fluoroethylene-propylene film, poly-4-methylpentene film, fluoroethylene-propylene film and teflon film.

As described above, the OF cable using the pre-embossed insulating polyolefin laminate paper of the present invention possesses the following advantageous features.

(1) The swelling of the cable with the insulating oil is minimal.

(2) The fluidity of the insulating oil between the overlapping plies of the film is satisfactory.

(3) The film exhibits outstanding mechanical properties for an insulating layer and enjoys good workability while being wound oh the conductor.

(4) The insulating layer wound on the conductor neither tightens nor slackens easily.

(5) The film excels in both dielectric constant and dielectric loss tangent so that required properties are provided at no sacrifice of economy.

(6) The cable excels in breakdown properties. It particularly is excellent in the positive property which is apt to be reduced when a plastic film is used.

(7) In the case of the OF cable including the metal sheath, a general soldering procedure is performed with a solder having a common melting point.

We claim:

1. A method for producing an insulating polyolefin laminated paper, comprising the steps of:
   providing first and second fiber paper layers having an impermeability of 20 to 4000 Gurley-seconds, at least one of said first and second fiber paper layers being mechanically deformed prior to lamination in such a manner that irregularities thereon have a depth of 2 to 50% of the thickness of said at least one fiber layer;
   controlling the water content of said first and second fiber paper layers immediately before lamination to maintain said water content at no more than 4%, said fiber paper layers having a thickness of at least 30 microns; and
   laminating said first and second fiber layers to a molten and extruded polyolefin layer.

2. The method of claim 1, wherein said providing step includes the step of mechanically deforming said at least one first paper layer to form said irregularities.

3. The method of claim 2, wherein both said first and second fiber paper layers are mechanically deformed and are mechanically deformed in separate operations.

4. The method of claim 2, in which said water content is no more than 2%.

5. The method of claim 2, wherein said water content is less than 1%.

* * * * *